Sept. 25, 1951  T. J. MESH  2,568,757
VIBRATORY ELECTRIC MOTOR
Filed Nov. 7, 1949
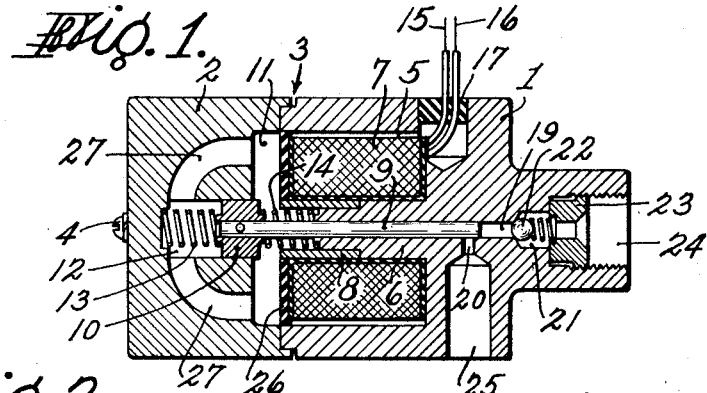
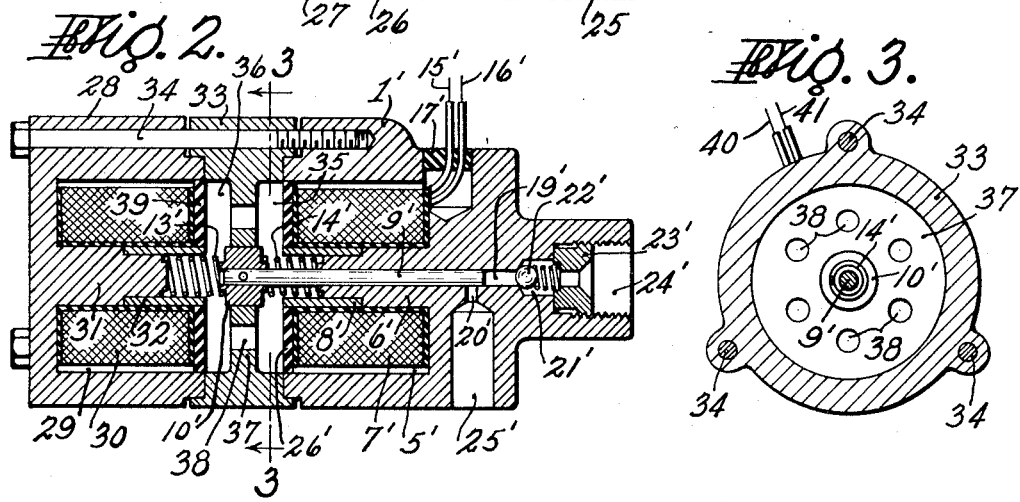
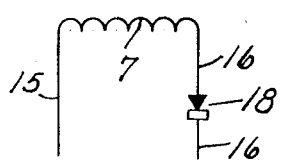
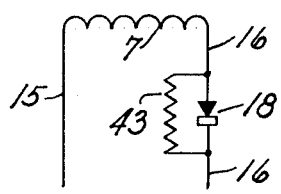
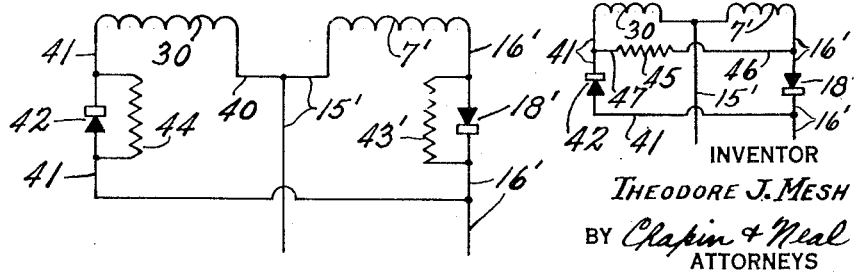
INVENTOR
THEODORE J. MESH
BY Chapin & Neal
ATTORNEYS Patented Sept. 25, 1951

2,568,757

UNITED STATES PATENT OFFICE 2,568,757

VIBRATORY ELECTRIC MOTOR

Theodore J. Mesh, Easthampton, Mass., assignor to Gilbert & Barker Manufacturing Company, West Springfield, Mass., a corporation of Massachusetts Application November 7, 1949, Serial No. 125,906

2 Claims. (Cl. 172—126)

1

This invention relates to improvements in vibratory motors of the electromagnetically-actuated type, operable when the electromagnet is energized intermittently by pulses at high frequencies, to cause the armature to oscillate or vibrate at corresponding high frequencies.

The invention has for one object the provision, in a motor of the type described, of an arrangement for neutralizing any residual magnetism, that may exist in the electromagnet, or electromagnets, of the motor during the intervals between those when the energizing electric pulses are supplied to the coil of the electromagnet— such arrangement allowing during each such first-named interval, the flow of demagnetizing current through the coil in sufficient amount to neutralize the residual magnetism.

The invention has for another object the provision in an electric motor of the type described, of two electromagnets, energized alternately by means of alternating current to move an armature back and forth, rectifiers being interposed in the circuit to each electromagnet in opposed relation so that only the positive half-waves of the alternating current flow through one electromagnet and only the negative half waves flow through the other electromagnet, whereby the armature is drawn first in one direction by one electromagnet and then in the other direction by the other electromagnet and thereby caused to vibrate at the frequency of the alternating current.

These and other objects will best be understood from the following detailed description of illustrative examples of the invention with reference to the accompanying drawings, in which:

Fig. 1 is a sectional elevational view of one form of motor embodying the invention;

Fig. 2 is a similar view of another form of motor embodying the invention;

Fig. 3 is a cross sectional view taken on the line 3—3 of Fig. 2;

Fig. 4 is a wiring diagram showing one circuit arrangement for the motor shown in Fig. 1;

Fig. 5 is a wiring diagram showing another circuit arrangement for the motor shown in Fig. 1;

Fig. 6 is a wiring diagram showing one circuit arrangement for the motor shown in Fig. 2; and Fig. 7 is a wiring diagram showing another circuit arrangement for the motor shown in Fig. 2.

Referring to these drawings and first to Fig. 1 thereof, the motor includes a casing constructed of suitable magnetic material, in two sections 1 and 2, which abut end to end, preferably with a rabbeted joint 3, and are clamped together in

2 any suitable manner as by a series of screws one of which is shown at 4. The section 1 has an annular recess 5, which surrounds a central hub 6 and receives an annular coil 7 of the electromagnet. The outer portion of hub 6 is of reduced diameter and pressed onto such portion is a sleeve 8 of suitable magnetic material, which extends slightly beyond the outer or left hand end of coil 7. The hub 6 terminates about midway of the length of sleeve 8. Slidably mounted in and coaxially of hub 6 is a rod 9 which extends to the left beyond sleeve 8 and has fixed thereto an annular member 10 of suitable magnetic material, forming the armature of the electromagnet. The casing section 2 has a cylindrical recess 11, registering with the recess 5, and a cylindrical hole 12 located coaxially of the armature and slidably receiving the latter. The armature 10 is balanced between two coil springs 13 and 14, which have the same dimensions and which are each under the same initial stress. The spring 13 acts between the end wall of hole 12 and the left hand end of the armature and the spring 14 acts between the right hand end of the armature and the end face of hub 6, suitable seats for these springs being provided as indicated. The armature is shown in its rest position midway of its stroke. When coil 7 is energized, the armature 10 will be drawn toward the end of sleeve 8, the magnetic circuit extending through the core 6, the sleeve 8, and the armature 10, thence outwardly through section 2 in many radiating paths, longitudinally to the right and successively through the annular parts of sections 2 and 1 and thence inwardly in many radial paths to the core 6. The coil 7 has lead wires 15 and 16, which extend out of casing section 1 through a suitable insulating seal 17 and which are adapted to be connected to a suitable source of electricity, such for example as a 110 volt, 60 cycle, alternating current. A suitable half-wave rectifier 18 (Fig. 4), which may for example be a selenium cell rectifier, is interposed in the wire 16. Thus, the coil 7 will be energized intermittently in pulses at the rate of 3600 per minute. When coil 7 is deenergized, in the interval between two successive energizing electric pulses, the armature 10 will move away from the end of sleeve 8 and to the left of the mid-position illustrated. The mass of the armature 10 and rod 9 and the characteristics of springs 13 and 14 are so selected as to have a natural period of vibration substantially equal to the frequency of the electrical pulses. The resonant springs serve to keep the armature 10 and rod 9 in vibration with only a small amount of assistance from coil 7, leaving the major part of the energy developed by coil 7 for the performance of useful work.

The reciprocating rod 9 can be connected to various mechanisms to perform various kinds of work. As a single illustrative example, the rod 9 may serve as the piston of a pump, the cylinder of which is shown at 19, the inlet port at 20, the outlet port at 21 and a spring-pressed outwardly-opening valve for the outlet port at 22, the valve spring being held in place by an annular nut 23, threaded into the outlet passage 24. When the motor is used to actuate a pump, the casing 1, 2 may be entirely sealed, except for the inlet and outlet passages 25 and 24, respectively. The coil 7 will be sealed in its annular recess by suitable sealing material 26. Any liquid leaking past the piston will pass into recess 11 and eventually fill the same. Passages 27 are provided connecting recess 11 to the inner end of hole 12 so that liquid may surge back and forth from the recess 11 and hole 12 as the armature 10 vibrates without building up pressure to resist movement of the armature.

The magnetic material of which the casing 1, 2 is constructed, may be cast iron because large cross sectional areas are available in all parts of the magnetic circuit, except inside the coil at the end nearest the armature, where soft steel is used for the sleeve 8 to compensate by its better magnetic qualities for the lesser cross sectional area available.

For some types of work, it may be desirable to move the armature in both direction by electromagnets, in which case the arrangement may be as shown in Fig. 2. Here, the casing is made up of three substantially cylindrical sections. One section is identical with the section 1 of Fig. 1 and has been marked 1'. The latter supports the same parts as did the section 1 of Fig. 1 and parts in Fig. 2, which correspond with parts in Fig. 1 have been designated by the same reference numerals with the addition of a prime. Another casing section 28, of suitable magnetic material and similar to section 1, is provided and such section has an annular recess 29 containing a second coil 30 having the same characteristics as coil 7' and surrounding a central coaxially-located hub 31, having fixed thereto a steel sleeve 32 similar to sleeve 8'. The third section 33 also of suitable magnetic material lies intermediate sections 1' and 28 and is clamped between them by a series of screws 34 (see also Fig. 3). The section 33 has two cylindrical recesses 35 and 36, respectively registering with the recesses 5' and 29, and an intervening wall 37, having a central hole to slidably receive the armature 10', and a circular series of angularly-spaced holes 38 (see also Fig. 3), which interconnect the recesses 35 and 36. This wall serves as part of the magnetic circuit of each electromagnet. The coil 30 may be sealed in its recess 29 by means of a member 39 in the same manner used for coil 7, and its lead wires 40 and 41 (Fig. 3) may be brought out of the casing 28 in the same manner as shown in connection with wires 15' and 16'. The springs 13' and 14' act on armature 10' in exactly the same manner, as before described, and the only difference over Fig. 1 is that spring 13' lies partially within sleeve 32, instead of hole 12 and seats on hub 31 instead of the end of hole 12.

The coils 7' and 30 may be connected as shown in Fig. 6. The coil 7' has its wires 15' and 16' connected to a 110 volt, 60 cycle alternating current supply circuit, as before, with a half-wave rectifier 18' interposed in wire 16'. The coil 30 is connected in parallel with coil 7' by its wires 40 and 41 which are connected to wires 15' and 16', respectively. A half-wave rectifier 42, such for example as a selenium cell rectifier, is interposed in wire 41 in opposed relation to the rectifier 18' so that the coils 7' and 30 are energized alternately, only the positive half-waves, for example, passing through coil 30 and only the negative half-waves, for example, passing through coil 7'. Thus, the two electromagnets will draw the armature 10' back and forth at the frequency of the alternating current supply. This arrangement for reciprocating the armature and its rod is believed to be new and constitutes one feature of the invention.

The circuits of Fig. 6 have been described as if the parts marked 43' and 44 were omitted as they may be because these parts are optional although desirable for reasons to be later described.

It is important in an electromagnetically-actuated high-frequency reciprocating-armature motor to eliminate any adverse effects that may be caused by residual magnetism. After one electromagnet has been energized for the planned interval, say 1/60 of a second, the flow of magnetic flux should promptly cease. Otherwise, if residual flux were left in one magnet it would pull on the armature in opposition to the pull of the return spring, or the other magnet as the case may be. To accomplish this result, an impedance, which may for example be a resistor 43, is shunted across the rectifier 18 in the case of the single magnet structure, as shown in Fig. 5. This resistor allows some demagnetizing current to flow through coil 7 during the intervals when it is desired to have the electromagnet de-energized. This current flow is opposite in direction to the magnetizing current, which rectifier 18 permits to flow, and is of such value as to produce enough magnetic flux to neutralize any residual flux in the electromagnet. In Fig. 6, a resistor 43' is shunted across rectifier 18' and a resistor 44 is shunted across rectifier 42 for the same purpose. Another arrangement for the same purpose is shown in Fig. 7. The circuit is the same as Fig. 6 except that in place of the two resistors 43' and 44, one for each rectifier, a single resistor 45 is used which serves alternately to shunt first one rectifier and then the other. The resistor 45 is connected by wires 46 and 47 to the wires 16' and 41 respectively at locations between the rectifiers 18' and 42 and coils 7' and 30. During the interval when rectifier 42 allows flow of current to coil 30, the other rectifier is shunted, the shunt including wire 41, rectifier 42, wire 41 as far as wire 47, resistor 45, wire 46, to wire 16'. Thus, a small amount of demagnetizing current can flow to coil 7' during the intervals when the rectifier 18' does not allow energizing current to flow to such coil. When the rectifier 42 does not allow the flow of energizing current to coil 30, this rectifier is shunted, the shunt path including wire 41 to wire 47, wire 47, resistor 45, wire 46, down wire 16' to rectifier 18', rectifier 18', and wire 16' to wire 41. Demagnetizing current may then flow from wire 15', coil 30, wire 41 to wire 47, wire 47, resistor 45, wire 46, down wire 46 to rectifier 18', and through rectifier 18' to wire 16'.

The shunting of the rectifiers to neutralize residual magnetism during the intervals when it is desired to have the magnets deenergized constitutes another important feature of the invention.

The operation of the motor will sufficiently appear from the foregoing description. It should be noted that the length of the stroke of the armature is controlled by the amount of magnetism produced with relation to the resistance afforded by the opposing spring and the back pressure of the pump. The design is such that the armature cannot contact the end of sleeve 8, 8' or 32 nor can the pump piston impinge on the outlet valve 22 or 22'. Variation of the stroke of the motor may be effected by varying the current supplied to the coil of the electromagnet. If the maximum current is such as to move the armature through a predetermined stroke, limited as above described to avoid impingement, then various lesser strokes may be produced by reducing the current supplied to the electromagnet.

What is claimed is:

1. A vibratory electric motor comprising, an electromagnet including a coil having a passage extending axially therethrough, a member of magnetic material having an end wall against the inner face of which one end face of said coil abuts, a core connected at one end to and extending from said face of said end wall into and part way only through the passage in said coil, and an annular shell connected to said face of the end wall and surrounding the outer periphery of the coil, a sleeve of magnetic material fixed to the other end of said core and extending through said passage to the other end face of said coil, a second member of magnetic material having an end wall with an inner face confronting the second-named end face of said coil and a shell projecting from the inner face of the second end wall and abutting the first-named shell to complete an enclosure for said coil and provide a cylindrical space between the inner face of the second end wall and the second-named end face of said coil, the end wall of the second member having a passage extending from its inner face inwardly in coaxial relation with said core toward but stopping short of its outer face; an armature slidably mounted in the last-named passage and closely engaging the wall thereof; said armature being in a magnetic circuit comprising both end walls, both shells, the core and sleeve and an axial air gap between the outer end of the sleeve and the adjacent end face of the armature; a rod fixed at one end to said armature and extending across the cylindrical space, into and through said sleeve and through said core, and springs one in the last-named passage between its inner end and the adjacent end face of the armature and the other coiled around said rod and acting between the other end face of the armature and the outer end of said core.

2. A vibratory electric motor comprising, an electromagnet including a coil having a passage extending axially therethrough, a member of magnetic material having an end wall against the inner face of which one end face of said coil abuts, a core connected at one end to and extending from said face of said end wall into and part way only through the passage in said coil, and an annular shell connected to said face of the end wall and surrounding the outer periphery of the coil, a sleeve of magnetic material fixed to the other end of said core and extending through said passage to the other end face of said coil, a second member of magnetic material having an end wall with an inner face confronting the second-named end face of said coil and a shell projecting from the inner face of the second end wall and abutting the first-named shell to complete an enclosure for said coil and provide a cylindrical space between the inner face of the end wall and the second-named end face of said coil, the end wall of the second member having a passage extending from its inner face inwardly in coaxial relation with said core toward but stopping short of its outer face; and other passages connecting the inner end of the last-named passage to said cylindrical space at points radially spaced from the outer end of the last-named passage, an armature slidably mounted in the last-named passage and closely engaging the wall thereof; said armature being in a magnetic circuit comprising both end walls, both shells, the core and sleeve and an axial air gap between the outer end of the sleeve and the adjacent end face of the armature; a rod fixed at one end to said armature and extending across the cylindrical space, into and through said sleeve and through said core, and springs one in the last-named passage between its inner end and the adjacent end face of the armature and the other coiled around said rod and acting between the other end face of the armature and the outer end of said core.

THEODORE J. MESH.

REFERENCES CITED

The following references are of record in the file of this patent:

UNITED STATES PATENTS

| Number | Name | Date |
|---|---|---|
| 2,310,185 | Weyandt | Feb. 2, 1943 |
| 2,434,337 | Soderstrom | Jan. 13, 1948 |

FOREIGN PATENTS

| Number | Country | Date |
|---|---|---|
| 467,199 | Great Britain | June 14, 1937 |